United States Patent
Oota

(10) Patent No.: US 7,952,494 B2
(45) Date of Patent: May 31, 2011

(54) MAP DISPLAY APPARATUS

(75) Inventor: Toshiyuki Oota, Chiryu (JP)

(73) Assignee: Denso Corporation, Kariya (JP)

( * ) Notice: Subject to any disclaimer, the term of this patent is extended or adjusted under 35 U.S.C. 154(b) by 331 days.

(21) Appl. No.: 12/243,438

(22) Filed: Oct. 1, 2008

(65) Prior Publication Data

US 2009/0088969 A1   Apr. 2, 2009

(30) Foreign Application Priority Data

Oct. 2, 2007   (JP) .................................. 2007-258824

(51) Int. Cl.
*G08G 1/123* (2006.01)

(52) U.S. Cl. ........... 340/995.27; 340/995.1; 340/995.28; 340/995.17; 701/207; 701/208

(58) Field of Classification Search ............. 340/995.27, 340/995.1, 995.28, 995.25, 995.14, 995.17; 701/200, 207, 208, 211, 213, 214, 212
See application file for complete search history.

(56) References Cited

U.S. PATENT DOCUMENTS

| | | | |
|---|---|---|---|
| 5,398,188 A * | 3/1995 | Maruyama | 701/208 |
| 5,874,905 A * | 2/1999 | Nanba et al. | 340/995.2 |
| 5,906,653 A * | 5/1999 | Ichimura et al. | 701/207 |
| 6,067,502 A | 5/2000 | Hayashida et al. | |
| 6,356,835 B2 * | 3/2002 | Hayashi et al. | 701/208 |
| 7,321,824 B1 * | 1/2008 | Nesbitt | 701/201 |

FOREIGN PATENT DOCUMENTS

| | | |
|---|---|---|
| JP | H2-229866 | 9/1990 |
| JP | A-H07-008592 | 1/1995 |
| JP | H9-257496 | 10/1997 |
| JP | H11-002530 | 1/1999 |
| JP | A-2001-116560 | 4/2001 |
| JP | A-2001-336946 | 12/2001 |
| JP | 2006-003089 | 1/2006 |

OTHER PUBLICATIONS

Notification of Reason(s) for Rejection dated Sep. 28, 2009 in corresponding Japanese patent application No. 2007-258824 (and English translation).

* cited by examiner

*Primary Examiner* — Toan N Pham
(74) *Attorney, Agent, or Firm* — Posz Law Group, PLC

(57) ABSTRACT

A map in a navigation apparatus is displayed on a screen with its orientation aligned with an orientation of a facility map that is distributed in a facility when a vehicle having the navigation apparatus is traveling in a facility area that has pre-memorized guide information. When the vehicle is traveling in a meandering section of a road, a rough direction is oriented upward in the map that is displayed on the screen. Furthermore, the map is displayed with an entrance direction, which is determined as a direction at a time of entering an area outside of the road such as a parking or the like, oriented upward under a circumstance that the vehicle is constantly turning its direction.

5 Claims, 3 Drawing Sheets

MAP DISPLAY APPARATUS

CROSS REFERENCE TO RELATED APPLICATION

The present application is based on and claims the benefit of priority of Japanese Patent Application No. 2007-258824 filed on Oct. 2, 2007, the disclosure of which is incorporated herein by reference.

FIELD OF THE INVENTION

The present disclosure generally relates to a map display apparatus for use in a vehicle.

BACKGROUND INFORMATION

As for a direction of the map which map display devices such as a navigation apparatuses display to a display screen, a north-up display mode that displays map north oriented in an upward direction on the display screen and a heading-up display mode that displays a traveling direction in a map oriented in an upward direction on the display screen are widely known. Among those display modes, the heading-up display mode always displays a map with a heading direction adjusted upward, thereby making a relation between a current vehicle position and the map more intelligible compared to the north-up display mode.

In addition, a display screen having two display areas with one area performing the north-up display mode with another area performing the heading-up display mode is proposed in Japanese patent document JP-A-H10-116026 (also patented as U.S. Pat. No. 6,067,502).

As mentioned above, although the heading-up display mode is advantageous in that a relation between the current position and the map is intelligible, the heading-up display mode does not necessarily provide a suitable display for all traveling situations. In other words, in a certain situation, rotating the map to always display the heading direction of the vehicle upward on the screen may make the map less intelligible.

SUMMARY OF THE INVENTION

In view of the above and other problems, the present invention provides a map display apparatus that displays a map in an intelligible manner according to a travel situation of the vehicle.

In an aspect of the invention, a map display apparatus for having a map displayed on a screen with a current vehicle position includes a situation determination unit for determining a travel situation of the vehicle, and a map orientation unit for orienting a map that is to be displayed on the screen on a condition that the travel situation of the vehicle is determined to be corresponding to a specific situation by the situation determination unit.

When a direction of the map on the display screen is controlled in the above-described manner according to the travel situation of the vehicle, the map in the map display apparatus of the present invention is more intelligible in comparison to the map in other apparatuses.

The map display apparatus of the present invention may be provided as a computer program stored in a computer readable medium. That is, when the computer is controlled by the program, the computer provides functions of the situation determination unit and the map orientation unit with the same advantageous effects of the map display apparatus.

BRIEF DESCRIPTION OF THE DRAWINGS

Other objects, features and advantages of the present invention will become more apparent from the following detailed description made with reference to the accompanying drawings, in which.

DETAILED DESCRIPTION

Figure 1:
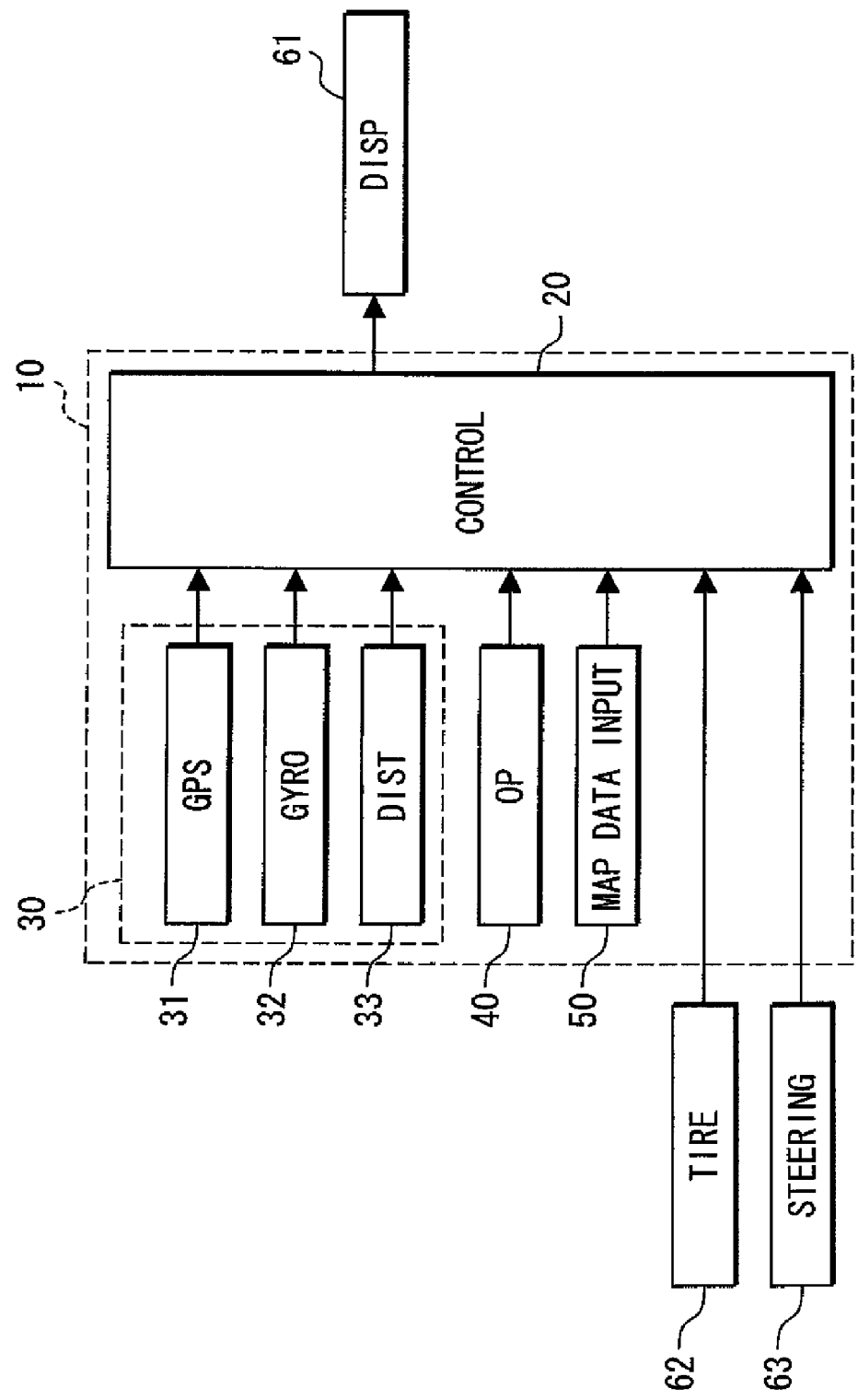
FIG. 1 is a block diagram of configuration of a navigation apparatus in an embodiment of the present invention.

Hereafter, with reference to the drawing, an embodiment of the present invention is described.

(1. Entire Configuration)

FIG. 1 is a block diagram of an outline configuration of a navigation apparatus 10 as that serves as a map display device of the embodiment is shown.

In the navigation apparatus 10 that is disposed and used in the vehicle, a control unit 20, a positional detector 30, an operation unit 40 and a map data input unit 50 are included. The control unit 20 is composed mainly of a microcomputer having a CPU, a ROM, a RAM, an I/O, and the like, and executes various processing based on a program stored in a memory such as the ROM. More practically, the processing includes a current position display processing that displays a current position of the vehicle having the navigation apparatus 10 together with a map in which the current position is included by calculating the current position as a set of the coordinates and a travel direction based on various detection signals from the positional detector 30 and by retrieving the map through the map data input unit 50. Further, the processing includes a route calculation processing that calculates an optimum route from the current position to a destination based on map data stored in the map data input unit 50 and the destination input from the operation unit 40, and a route guidance processing that displays the optimum route on the display screen of a display unit 61 for route guidance as well as other processing.

Moreover, detection signals from a tire speed sensor 62 installed in the vehicle and a steering wheel sensor 63 installed in the vehicle are input to the control unit 20. The sensor 62 is used to detect rotational speed of each of tires of the vehicle, and a speed of the vehicle is calculated on the basis of the detection value of the sensor 62. The steering wheel sensor 63 outputs the detection signal corresponding to an amount of the operation of the steering wheel of the vehicle, and an angular speed of the vehicle is calculated on the basis of the detection value and the speed of the vehicle.

The positional detector 30 is used to detect the current position of the vehicle, and includes a GPS receiver 31, a gyroscope 32, and a distance sensor 33. The GPS receiver 31 receives the electric wave from a space satellite of GPS (Global Positioning System), and outputs a reception signal.

The gyroscope 32 detects an amount of gyration of the vehicle. The angular speed of the vehicle may be calculated on the basis of the detection value of the gyroscope 32. The distance sensor 33 detects a travel distance of the vehicle based on an acceleration in a front-rear direction of the vehicle and other values.

The control unit 20 calculates a position of the vehicle (i.e., latitude, longitude, altitude), a travel direction, a speed and the like on the basis of the output signal from these sensors 31 to 33. The operation unit 40 is used to input various instructions from the user, and has a mechanical key switch and the like. The control unit 20 changes the display mode of the map on the display screen of the display unit 61 according to the instruction from the user input through the operation unit 40.

For instance, the control unit 20 changes the scale of the map on the screen of the display unit 61 when a map scale change instruction (e.g., zoom in or zoom out) is input.

When a display mode change instruction for changing map orientation determination conditions is input, the control unit 20 changes the display mode according to the instruction. In the navigation apparatus 10 of the present embodiment, the display mode of the map is chosen from three modes. That is, a heading-up mode, a north-up mode, and an auto-change mode are included in the selection. The heading-up mode is an operational mode in which the heading-up display of the map is always performed, and the north-up mode is an operational mode in which the north-up display of the map is always performed. On the other hand, the auto-change mode is an operational mode that automatically changes the display mode from the heading-up mode that serves as a basic mode according to the travel situation when the travel situation corresponds to a specific situation.

The map data input unit 50 is a device to input various data memorized in the map data storage medium (for instance, hard disk and DVD-ROM, etc.) not shown in the drawing. The map data storage medium stores various data such as the map data (i.e., node data, link data, background data, road data, name data, and intersection data, etc.), voice data for guidance and the like.

Further, the map data storage medium stores area information as well as guide information of specific facilities (e.g., amusement parks, large-scale shopping centers). That is, the area information includes information of where the facility is located, and the guide information includes information on the facility that has an orientation of a map that is distributed in the facility. That is, the large-scale facility usually distributes an original map for showing park locations and the like, and the original map of this kind may have a predetermined map orientation that arranges the map in a manner other than the north-up orientation. Therefore, the predetermined map orientation is stored as the guide information of the specific facility.

In addition, the map data storage medium stores in advance a curvy road in a mountain or the like as a meandering section.

(2. Processing Performed by the Navigation Apparatus)

The processing by the navigation apparatus 10 of the present embodiment is described in the following.

The navigation apparatus 10 of the present embodiment is characterized by the map display mode that resolves the problems of the heading-up display mode without compromising the merit of the heading-up display mode. That is, the heading-up mode has a merit that provides an intuitively comprehensible relation between the current position of the traveling vehicle and the map due to an automatic rotation of the map so that the traveling direction of the vehicle and the upward direction of the map always agree. However, in the following cases of the travel situation of the vehicle, an undesirable condition is created due to the automatic rotation of the map display that aligns the map orientation with the traveling direction of the vehicle in the heading-up display mode (i.e., cases 1 to 3).

(1) Case 1: Rotation of Map Display While Traveling a Mountain Road

In such a travel situation, it is considered that the user doesn't often hope the map frequently rotating when he/she is seeing a large area map while driving, even if a frequent map rotation is desired when the user is seeing a small area map. It is because the user is often seeing a rough travel direction of the vehicle in the large area map instead of seeing the small curvy area of the road.

(2) Case 2: Rotation of Map Display While Traveling in Parking Building (in Particular, Multi-story Parking Garage)

For instance, the user doesn't enjoy the merit of map rotation when he/she travels a spiral path in the parking tower or the like, only with an increased sense of confusion of "where am I."

(3) Case 3: Rotation of Map Display in an Area of Large-scale Facility

For instance, the original map only for use in and around the facility such as an amusement park and a large-scale shopping center uses a specific map orientation other than the north-up format. This is because readability at a glance is prioritized than the conventional north-up format, which better serves the users. Therefore, it is more comprehensible and convenient for the user to display the current position of the vehicle by using the map orientation in accordance with the original map in the area of such facilities.

As shown in the above three cases, it may be difficult to understand the map when the map is displayed in the heading-up display mode. Therefore, in the navigation apparatus 10 of the present embodiment, the auto-change mode that automatically changes the display mode corresponding to the travel situation upon detecting a specific travel situation with the heading-up display mode used as the basic mode is provided.

Figure 2:
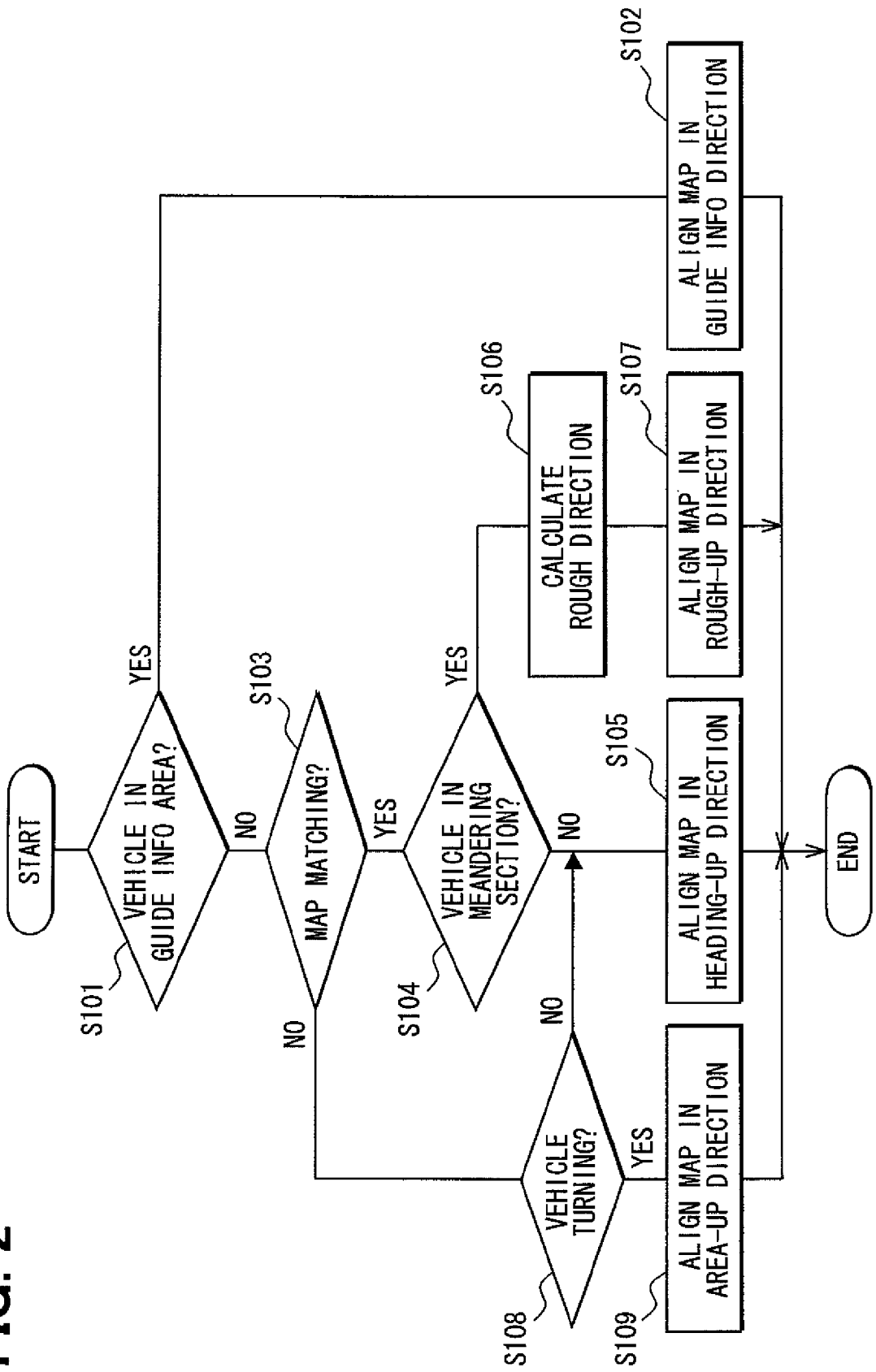
FIG. 2 is a flow chart of display mode determination processing.

The processing performed by the control unit 20 of the navigation apparatus 10 is practically explained when the map display mode is chosen to be in the auto-change mode. FIG. 2 is a flow chart of the display mode determination processing that the control unit 20 executes at regular intervals (For instance, every 100 ms). The display mode determination processing is performed by the CPU 20 according to the program memorized in the ROM of the CPU 20 or any other storage.

It is determined, at S101 in the display mode determination processing by the control unit 20, whether or not the current position of the vehicle is in an area of the facility where the guide information is memorized. In a word, it is determined whether or not the vehicle travels in the area of the facility where the guide information is memorized.

Then, the process proceeds to S102 when it is determined that at S101 and the current position of the vehicle is in the area of the facility where the guide information is memorized (S101:YES), and the orientation of the map displayed on the screen of the display unit 61 is determined to be aligned with the guide information before ending the process. In a word, while the vehicle is traveling in the area of the facility where the guide information is memorized, the map is displayed in the display unit 61 in the same way as the orientation of the map distributed in the facilities.

On the other hand, the process proceeds to S103 when it is determined at S101 that the current position of the vehicle is in the area of the facility where the guide information is memorized (S101:NO), and the current position of the vehicle determined whether or not the position is matched to the road on the map that is displayed on the screen of the display unit 61. In a word, it is determined whether or not the vehicle is traveling on the road.

When the current position of the vehicle is determined to be in the map-matched condition on to the road on the map at S 103 (S103:YES), the process proceeds to S 104, and the process determines whether the current position of the vehicle is in a meandering section. In other words, it is determined whether or not the current situation is that the vehicle is traveling in the meandering section memorized to a map data memory medium in advance.

Then, the process proceeds to S105 when it is determined at S104 that the current position of the vehicle is in the meandering section (S104:NO), and the orientation of the map displayed on the screen of the display unit 61 is determined to be heading-up before the present display mode determination processing is ended. In a word, while the vehicle is traveling on roads other than the meandering section (i.e., during the normal travel), the heading-up display mode is used.

Figure 3A:
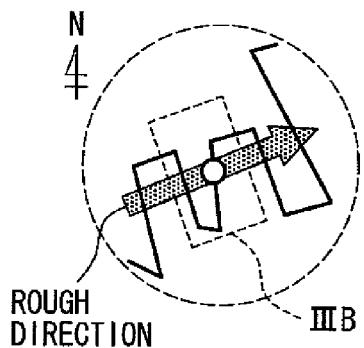
FIGS. 3A and 3B are illustrations of rough direction determination processing.
Figure 3B:
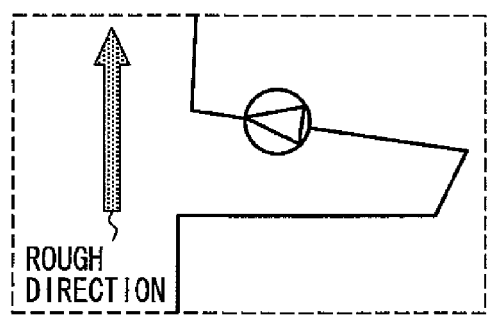

On the other hand, the process proceeds to S106 when it is determined at S104 that the current position of the vehicle is in the meandering section (S104:YES), and a rough travel direction in the meandering section is calculated as a rough direction as shown in FIGS. 3A and 3B. The rough direction is calculated on the basis of only the displayed portion of the meandering section on the screen of the display unit 61 specifically. Therefore, the rough direction changes when the map scrolls on the screen of the display unit 61 according to the travel of the vehicle through the meandering section, and the change of the rough direction becomes small in proportion to the map reduction rate, that is, the change becomes smaller in the small scale map. In a word, the rotation of the map becomes mild in a large area display of the map compared with a usual heading-up display mode. The rough direction may also be determined as a vector that starts at a beginning point of the meandering section displayed on the screen and points to an end point of the meandering section on the screen, or may be determined as a direction derived from an approximation of the meandering road to a straight one.

Then, the present display mode determination processing is ended after the orientation of the map displayed on the screen of the display unit 61 is determined as "rough-up" that aligns the rough direction calculated at S106 with the up of the map at S107. In a word, the map is aligned in a rough-up direction while the vehicle is traveling in the meandering section.

Figure 4A:
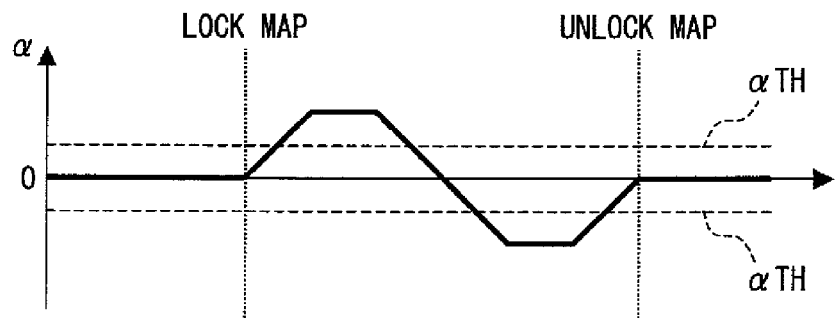
FIGS. 4A to 4C are diagrams of vehicle rotation determination process.
Figure 4B:
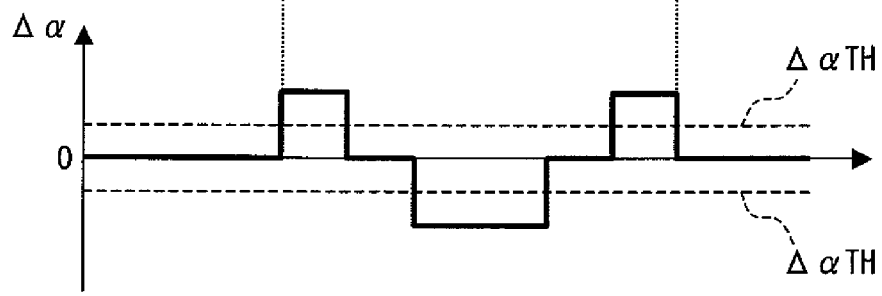

On the other hand, when the current position of the vehicle is determined as not map-matched on to the road of the map at S103 (S103:NO), the process proceeds to S108 and turning of the vehicle is determined. More practically, as shown in FIG. 4A, whether or not the angular speed $\alpha$ of the vehicle (absolute value) is equal to or greater than a threshold $\alpha_{TH}$, or as shown in FIG. 4B, whether or not the change rate of the angular speed $\Delta\alpha$ of the vehicle (absolute value) is equal to or greater than a threshold $\Delta\alpha_{TH}$ is examined, and when at least one of those values exceeds the threshold, the vehicle is determined to be turning. For instance, the vehicle is determined to be turning when it is traveling a spiral passage in the multi-story parking garage or the like. That is, when the vehicle travels comparatively steep curves, it is determined as a rotation of the vehicle.

When the vehicle is determined as not turning at S108 (S108:NO), the process proceeds to S105, and the orientation of the map displayed on the screen of the display unit 61 is determined to be heading-up before the present display mode determination processing is ended. In a word, even when the vehicle is traveling in an area that is not on the map, the heading-up display mode is used if the vehicle is not traveling a steeply curved road.

Figure 4C:
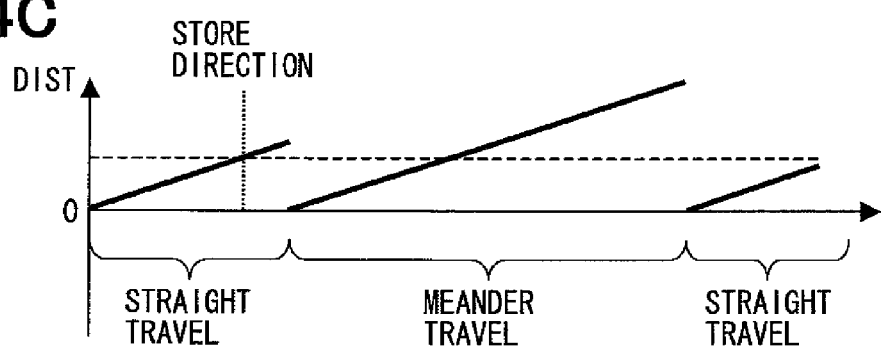

On the other hand, when it is determined that the vehicle is turning at S 108, the process proceeds to S 109, and the map orientation is determined as "area-up" that aligns, with the up of the map, a direction along which the vehicle has been traveling for a long distance on a straight road in its travel history. Then, the process is ended. More practically, as shown in FIG. 4C, when the straight travel distance of the vehicle has exceeded a prescribed value, the travel direction at that time is memorized (The direction information is constantly overwritten on top of the previous information). Then, the orientation of the map is locked with the memorized direction (e.g., the travel direction of the vehicle in a steadily-straight long travel section) being oriented upward while the vehicle is turning. The lock of the map is performed when the rotation of the vehicle aligns the travel direction of the vehicle with the memorized direction. The locked state of the map is released when lock conditions are not fulfilled. The release of the locked state may be triggered differently from the lock conditions. That is, lock release conditions may be separately used. For instance, when a straight travel exceeding a certain distance is detected, the lock may be released.

(Advantageous Effects)

The navigation apparatus 10 of the present embodiment changes an orientation of a map that is displayed to a display screen of the display unit 61 from the heading-up mode to a specific display mode while the travel situation of the vehicle is determined as a specific situation under a circumstances that the auto-change mode is chosen as the map display mode. Therefore, the map can be intelligibly displayed compared with the case that always uses the heading-up display mode regardless of the travel situation of the vehicle.

More practically, the map is displayed in the same direction as the orientation of the map that is distributed in a facility where the guide information is memorized to the vehicle in advance (S102), while the vehicle is traveling is the area of the facility (S101:YES). Therefore, the position of the vehicle in the area of the facility can be intuitively understood compared with the heading-up display mode.

Moreover, while the vehicle is traveling the meandering section registered beforehand (S103:YES, S104:YES), the rough direction is used as an up direction of the map for displaying the map on the screen (S106, S107). Therefore, decrease of useless rotation of the map is achieved compared with the heading-up display mode, and the map can be displayed more intelligibly. In particular, due to the calculation of the rough direction based only on the meandering section displayed on the screen, the degree of rotation of the map is increasingly decreased when the map coverage becomes broader.

Moreover, the upward of the map is aligned with the direction of the steadily-straight travel of the vehicle (S109) while the vehicle is traveling in a garage or the like, that is, while the vehicle is traveling outside of the road (S103:NO), under circumstances that the vehicle is turning (S108:YES). Therefore, the map is prevented from unnecessarily rotation when the vehicle travels in, for example, the multi-story parking garage or the like with its travel direction constantly turning.

(4. Correspondence with Claims)

In the navigation apparatus 10 of the present embodiment, the control unit 20 serves as a situation determination unit when performing the processing of S101, S103, S104, and S108, and serves as a map orientation unit when performing the processing of S102, S105 to S107, and S109 in an execution of the display mode determination processing (FIG. 2).

(5. Other Embodiments)

Although the present invention has been fully described in connection with the preferred embodiment thereof with reference to the accompanying drawings, it is to be noted that various changes and modifications will become apparent to those skilled in the art.

For example, the map may be displayed with the rough travel direction oriented upward in a section of a road other than the meandering section according to the user's instruction, instead of taking the "rough-up" mode only in the meandering road section as described in the above embodiment.

Moreover, the map may be displayed with the direction at a point of entering, for example, a parking oriented upward, instead of, as described in the above embodiment, being aligned with the steadily-straight travel direction under the circumstances that the vehicle is not being map-matched on to the road of the map and is turning. More practically, the direction when the vehicle enters a non-map-matching area is memorized and the map orientation is locked to the direction at the time of entrance into the non-map-matching area while the vehicle is traveling a steep curve. In this case, the entrance into an area of the multi-story parking building or the like may be, for example, detected by recognizing a polygon for representing the parking building on the map.

Further, the rotation of the vehicle is determined, in the above-mentioned embodiment, by detecting whether the angular speed or the change of the angular speed exceeds a threshold. However, the rotation of the vehicle may be determined by using other index. That is, for example, the operation amount of the steering wheel exceeding a threshold may be used to determine the rotation of the vehicle.

Furthermore, though the heading-up display mode is assumed as a basic display mode with switching to the auto-change mode under a certain circumstance in the above embodiment, the north-up mode may also be used as the basic display mode. Furthermore, the basic display mode may be specified by the user.

Such changes and modifications are to be understood as being within the scope of the present invention as defined by the appended claims.

What is claimed is:

1. A map display apparatus for having a map displayed on a screen together with a current vehicle position, the apparatus comprising:
    a situation determination unit for determining a travel situation of a vehicle; and
    a map orientation unit for setting a specific orientation of the map that is to be displayed on the screen on a condition that the travel situation of the vehicle is determined to be corresponding to a specific situation by the situation determination unit, wherein
    the situation determination unit is capable of determining whether or not the vehicle is traveling in a registered area that has a predetermined map orientation, and
    the map orientation unit sets the orientation of the map to be aligned with the predetermined map orientation of the registered area when the vehicle is determined to be traveling in the registered area by the situation determination unit.

2. A map display apparatus for having a map displayed on a screen together with a current vehicle position, the apparatus comprising:
    a situation determination unit for determining a travel situation of a vehicle; and
    a map orientation unit for setting a specific orientation of the map that is to be displayed on the screen on a condition that the travel situation of the vehicle is determined to be corresponding to a specific situation by the situation determination unit, wherein
    the situation determination unit is capable of determining whether or not the vehicle is traveling in a meandering section that has been registered, and
    the map orientation unit sets an upward orientation of the map on the screen to be aligned with a roughly-estimated travel direction of the vehicle when the vehicle is determined to be traveling in the meandering section by the situation determination unit.

3. The map display apparatus of claim 2, wherein
the map orientation unit calculates the roughly-estimated travel direction of the vehicle based on a displayed portion of the meandering section on the screen.

4. A map display apparatus for having a map displayed on a screen together with a current vehicle position, the apparatus comprising:
    a situation determination unit for determining a travel situation of a vehicle; and
    a map orientation unit for setting a specific orientation of the map that is to be displayed on the screen on a condition that the travel situation of the vehicle is determined to be corresponding to a specific situation by the situation determination unit, wherein
    the situation determination unit is capable of determining whether or not the current vehicle position is map-matched to a road on the map displayed on the screen, and
    the map orientation unit sets an upward orientation of the map on the screen to be aligned with one of historical travel directions of the vehicle in a travel history of the vehicle when the vehicle is determined by the situation determination unit to be in a situation that does not have the current vehicle position map-matched to the road.

5. The map display apparatus of claim 4, wherein
the situation determination unit is capable of determining an angular speed of the vehicle, and
the map orientation unit sets the upward orientation of the map on the screen when the vehicle is determined by the situation determination unit to be in a situation that does not have the current vehicle position map-matched to the road and in a situation that at least one of the angular speed and a change amount of the angular speed respectively determined by the situation determination unit is equal to or greater than a predetermined threshold.

* * * * *